United States Patent [19]

Luecke

[11] Patent Number: 5,245,478

[45] Date of Patent: Sep. 14, 1993

[54] MOUNT FOR BEREK COMPENSATOR

[75] Inventor: Francis S. Luecke, San Jose, Calif.

[73] Assignee: New Focus, Inc., Mountain View, Calif.

[21] Appl. No.: 879,773

[22] Filed: May 6, 1992

[51] Int. Cl.$^5$ .............................................. G02B 7/02
[52] U.S. Cl. ..................................... 359/822; 359/384; 359/557; 359/830
[58] Field of Search ............... 359/500, 73, 83, 811, 359/815, 819, 827, 830, 554, 557, 487, 494, 384, 822

[56] References Cited

U.S. PATENT DOCUMENTS

| | | | |
|---|---|---|---|
| 2,460,515 | 2/1949 | Lowber et al. | 88/65 |
| 3,466,129 | 9/1969 | Agatsuma et al. | 356/115 |
| 3,574,441 | 4/1971 | Harris et al. | 350/150 |
| 4,232,275 | 11/1980 | Kolb, Jr. | 331/94.5 |
| 5,033,830 | 7/1991 | Jameson | 350/403 |
| 5,138,496 | 8/1992 | Pong | 359/822 |

Primary Examiner—Bruce Y. Arnold
Assistant Examiner—James Phan
Attorney, Agent, or Firm—Hugh D. Jaeger

[57] ABSTRACT

The present invention is a mount for optical instruments, and particularly, for a Berek compensator having a birefringent crystal, which can be both tiled and rotated by structure of adjustment rings which are concentric to the optical path of the device.

22 Claims, 4 Drawing Sheets

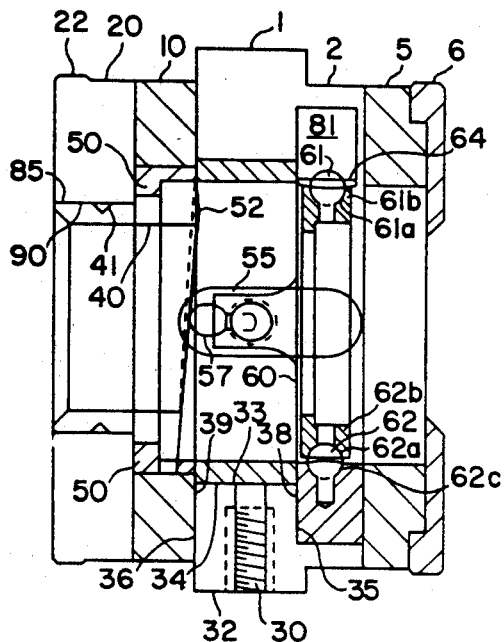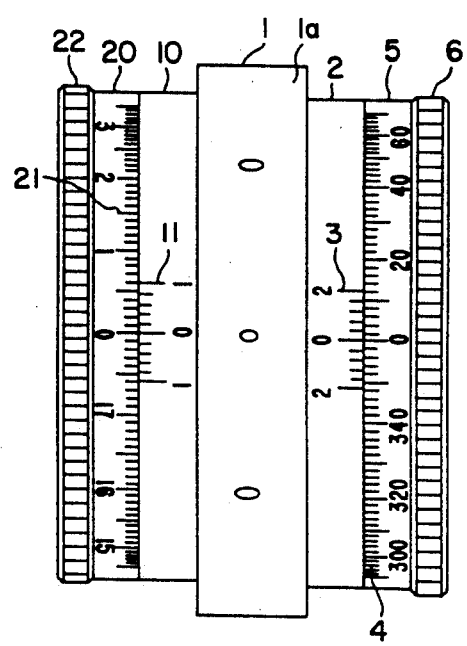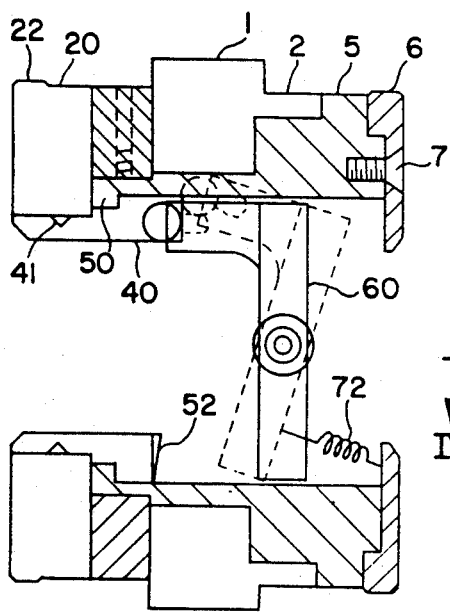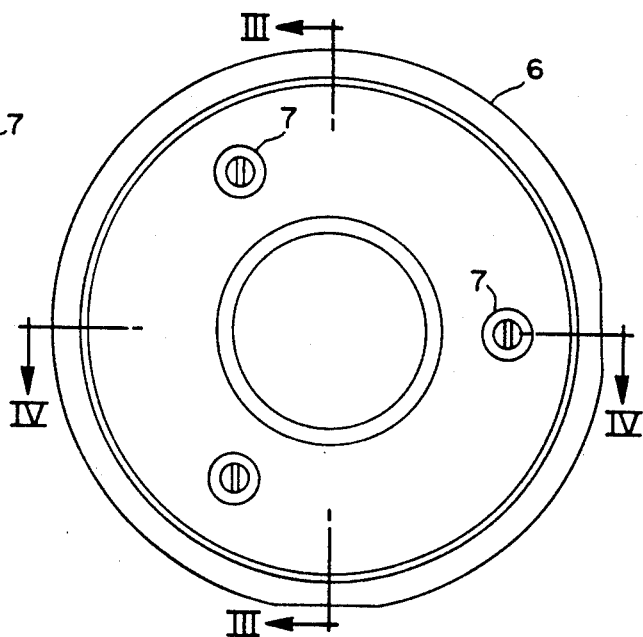
FIG. 3
FIG. 1
FIG. 4
FIG. 2

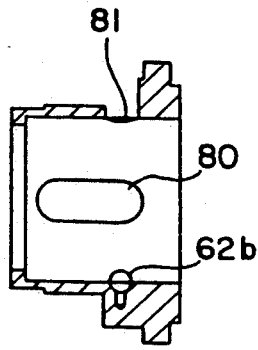
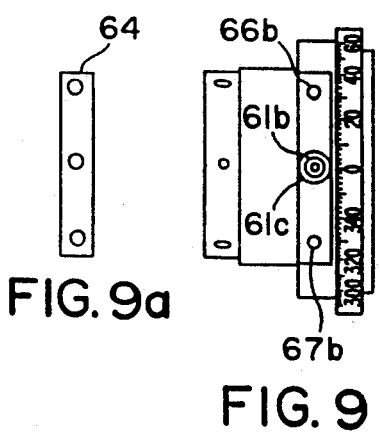
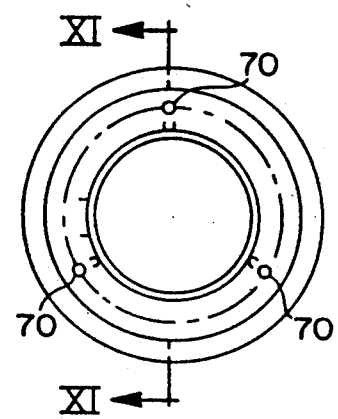
FIG. 11    FIG. 9a    FIG. 9    FIG. 10
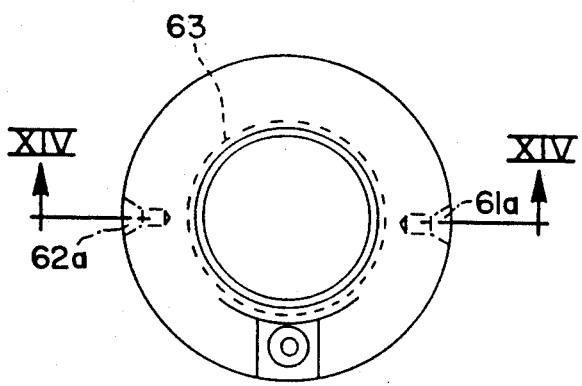
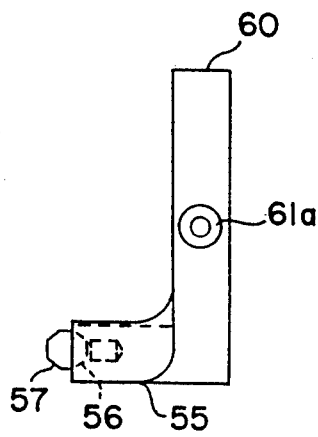
FIG. 13    FIG. 12
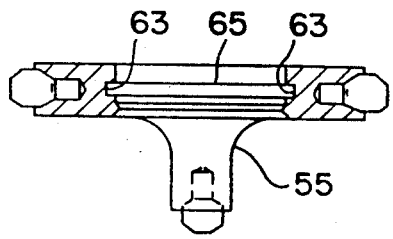
FIG. 14

MOUNT FOR BEREK COMPENSATOR

BACKGROUND OF THE INVENTION

1. Field of the Invention

This invention relates to optical instruments, and particularly to a Berek compensator having a birefringent crystal, which can be both tilted and rotated by means of adjustment rings which are concentric to the optical path of the device.

2. Description of the Prior Art

In the field of experimental optics there is a frequent need to introduce a variable phase difference in an optical beam. Various devices exist for this purpose, perhaps the best known of which is the Soleil-Babinet compensator. The Soleil-Babinet compensator utilizes a pair of rectangular-shaped crystal elements having their optical axis perpendicular to each other so that the ordinary ray in one is the extraordinary wave in the other. One of the rectangular elements is further divided into two wedge-shaped sections. One of the wedge sections is movable with respect to the other so that the total length of the optical path through the pair of wedges is variable with respect to the length of the optical path in the undivided rectangular element. Thus, the phase shift of the incident ray is proportional to the relative lengths of the optical paths. Such devices are described in *Principles of Optics*, 6th Edition, Max Born and Emil Wolf at pages 693-694, and are commercially available for example from Melles Griot, Inc., Irvine, Calif. Another type of variable retarder is described in U.S. Pat. No. 3,924,930, and is commercially available from Cleveland Crystals, Inc., Cleveland, Ohio.

While the Soleil-Babinet compensator can provide the requisite optical function of a variable phase shift, it requires the fabrication of two wedge-shaped crystals. It also requires a mechanical mechanism to move one wedge relative to the other while maintaining all elements in precise optical alignment. The device also suffers from the requirement for motion transverse to the optical path, thereby adding to the size of the device. Size is not a trivial aspect since it would be desirable to have a compensator having minimal diameter which would permit mounting in a universal type of optical mount of the type having adjustments facilitating the initial set-up and alignment. Similarly, other commercially available retarders require complex optical and mechanical element fabrication, and are large compared to the usable optical aperture.

Another variable phase shift device, known as the Berek compensator, is described in *Principles of Optics* at page 694. In this device, the active element is a single crystal of birefringent material positioned so that the optical axis is perpendicular to the parallel faces of the crystal. The variable phase shift is created by tilting the crystal relative to the incident beam. While the Berek compensator is well understood and widely known, it has not found wide application in the laboratory.

The lack of practical application of the Berek compensator may be due, at least in part, to the requirement for tilting the crystal and the attendant mechanical complexity necessary to provide the requisite precision control.

SUMMARY OF THE INVENTION

It is an object of this invention to provide a Berek compensator, or similar device. having a tilt and rotate adjustment.

It is another object of this invention to provide an optical mount of minimal diameter adapted to provide precision tilt and rotational movement to an optical element.

Still another object of this invention is to provide an improved Berek optical compensator of minimal diameter.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 1 is a side view of the mount of this invention;

FIG. 2 is an end view of the mount of this invention taken from the right side of FIG. 1;

FIG. 3 is a sectional view of the mount of this invention taken along the line III—III of FIG. 2;

FIG. 4 is a sectional view of the optical mount of this invention taken along the line IV—IV of FIG. 2;

FIG. 9 is a side view of the axially rotatable cylinder showing the bearing retention plate;

FIG. 9A is a top view of the bearing retention plate illustrated in FIG. 9;

FIG. 10 is an end view of the axially rotatable cylinder;

FIG. 11 is a sectional view of the axially rotatable cylinder taken along the line XI—XI of FIG. 10;

FIG. 12 is a side view of the optical element holder;

FIG. 13 is an end view of the optical element holder;

FIG. 14 is a sectional view of the optical element holder taken along the line XIV—XIV of FIG. 13;

DETAILED DESCRIPTION OF THE PREFERRED EMBODIMENTS

Figure 5:
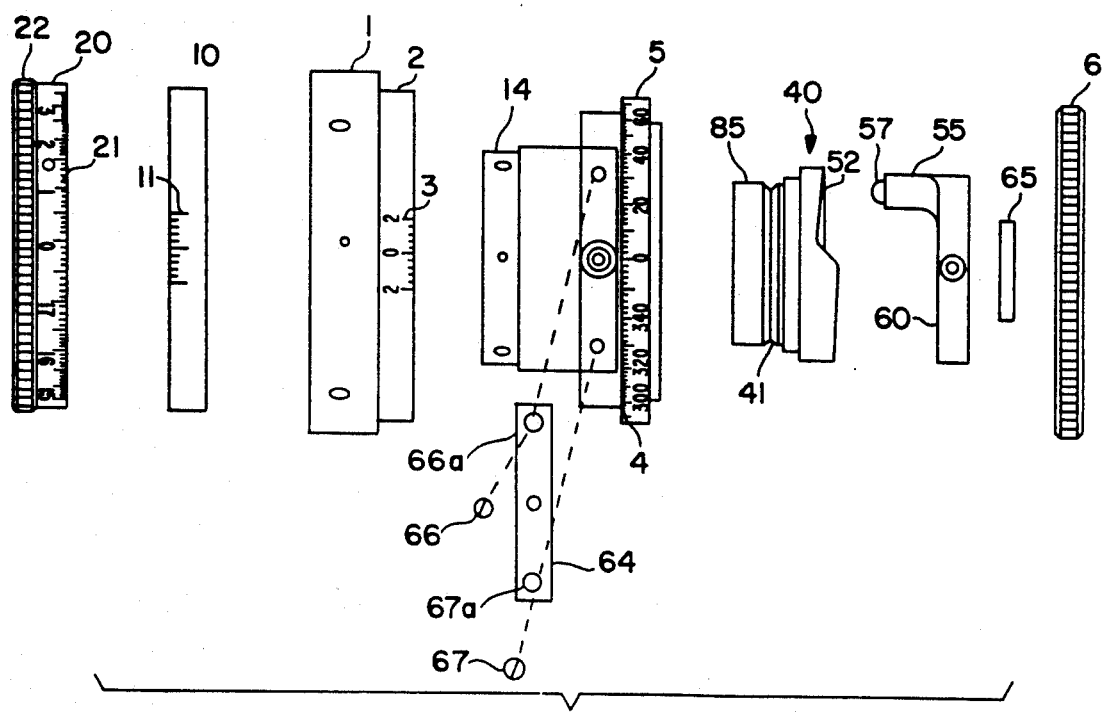
FIG. 5 is an exploded view of the optical mount of this invention.

With reference to FIG. 1, optical mount of this invention includes a stationary cylindrical base ring 1 having a first, outer cylindrical surface 1a which is slightly greater in diameter than the rest of the mount to facilitate clamping in a conventional clamp. Base ring 1 is also fitted with a tapped hole 30 to permit it to be affixed to a conventional threaded post. Base 1 has a rotation scale barrel portion 2 with a vernier scale 3 which coacts with the degree scale 4 on a first, axially rotatable, rotation cylinder 5. A knurled rim 6 affixed to rotation cylinder 5 assists in positioning the cylinder relative to base ring 1.

Rotation cylinder 5 has a tilt vernier barrel portion 10 containing the tilt vernier scale 11. The second, axially rotatable tilt cylinder 20 has a tilt scale 21 and a knurled rim 22 affixed thereto for ease in adjusting the tilt mechanism.

FIG. 2 is a right end view of the optical mount shown in FIG. 1. The knurled rim 6 is secured to the axially rotatable rotation cylinder 5 by means of screws 7 which pass into tapped holes, not shown, in rotation cylinder 5.

FIG. 3 is a sectional view of the optical mount taken along the line III—III of FIG. 2. Parts shown in FIGS. 1 and 2 are identified with the same reference characters. Base ring 1 has a tapped hole 30 which may be used with conventional mounting posts to secure the mount to a bench or optical table. Alternatively, the outer cylindrical surface 32 of base ring 1 can be clamped in devices adapted to hold round optical elements such as the 2-inch multi-function mount Model No. 9850 offered for sale by New Focus, Inc., 340 Pioneer Way, Mountain View, Calif.

The inner cylindrical surface 33 of base ring 1 abuts the outer surface 34 of rotation cylinder 5. The end surfaces 35 and 36 of base ring 1 abut the shoulder portions 38 and 39 of the groove in rotation cylinder 5 formed by the surfaces 34 38 and 39. Rotation cylinder 5 is thus held in axial alignment with base ring 1, and is restrained form longitudinal movement along the axis of the system while freedom for rotational movement is retained.

Tilt cylinder 20 includes a cam portion 40 described in more detail with reference to FIG. 15. Cam portion 40 has a "V" groove 41 extending about the periphery. This groove is adapted to receive pointed set screws passing through threaded holes in the outer portion 23 of tilt cylinder 20. The pointed set screws provide accurate positioning and locking of the cam portion 40 relative to the outer portion 23 by defining a cylindrical ridge which, in conjunction with the rim 50 on the inner cylindrical surface of rotation cylinder 5, rotatably mounts tilt cylinder 20 within rotation cylinder 5.

The cam portion 40 includes an axial cam surface 52 on the interior end of the cylinder. Cam surface 52 engages the cam follower 55 of optical element holder 60, described in more detail with reference to FIGS. 12, 13 and 14. Optical element holder 60 is positioned within the rotation cylinder 5 by means of first and second bearing elements 61 and 62. Bearing elements 61 and 62 include conical seats 61a and 62a, which are adapted to receive the balls 61b and 62b. A corresponding conical seat 62c at the lower end of rotation cylinder 5 receives ball 62b. The upper ball 61b is seated in hole 61c within the bearing spring plate 64, described in more detail with reference to FIGS. 9, 9A, 10 and 11.

It can therefore be seen that rotational movement of tilt cylinder 20 relative to rotation cylinder 5 causes the axial cam surface 52 to move cam follower 55 and rotate optical element holder 60 about the axis defined by the bearing elements 61 and 62. A spring 72, described with reference to FIG. 4, holds cam follower 55 in engagement with ball 57 and cam surface 52.

FIG. 4, a sectional view taken at 90 degrees to that of FIG. 3, shows optical element holder 60 displaced from the position perpendicular to the optical axis of the system in the broken line view. It will be appreciated that element holder 60 may also be rotated by inserting an object into the interior of rotation cylinder 5 and pressing against the side of holder 60 in a fashion to rotate holder 60 away from axial cam surface 52 against the restraining action of spring 72. FIG. 4 also shows the screw 7 which holds knurled rim 6 to rotation cylinder 5.

FIG. 5 is an exploded view of the major component parts of the optical mount of this invention. Base ring 1 accommodates the rotation cylinder 5, which is inserted through the base ring 1. The rotation cylinder 5 has a reduced diameter portion 14 which, after insertion through the base ring 1, provides a support for vernier barrel portion 10, which is fastened to base ring 1 by means of set screws. Cam portion 40 passes through the interior of rotation cylinder 5, and is retained in place by means of the outer portion 10, which is fastened by means of set screws which bear against the "V" groove 41. Optical element holder 60 is positioned within the rotation cylinder 5, and is supported for rotational movement by bearings previously described. The bearings are held tightly against the element holder 60 by bearing spring plate 64, which has a pair of mounting holes 66a and 67a which accommodate screws 66 and 67. Bearing spring plate is slightly flexed when fastened to the rotation ring 5 to load the bearing elements and prevent other than rotational movement. The cam follower 55 on element holder 60 contains a bearing ball 57 which rides on cam surface 52, causing the element holder 60 to tilt about the axis defined by the bearings. Birefringent crystal 65 is mounted on the element carrier 60. The knurled ring 6 is fastened to the right hand end of the rotation cylinder 5.

Figure 6:
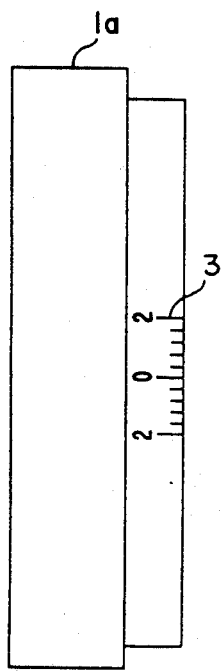
FIG. 6 is a side view of the base of the mount of this invention.

FIG. 6 shows stationary base ring 1 in detail. The outer cylindrical surface 1a has a nominal diameter of 2 inches to make the device compatible with other optical devices and permit the use of the same clamps. The inner cylindrical surface 1b, shown in FIG. 7, provides a bearing surface for the rotation cylinder 5.

Figure 8:
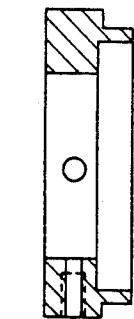
FIG. 8 is a sectional view of the base shown in FIGS. 6 and 7 taken along the line VIII—VIII of FIG. 7.
Figure 7:
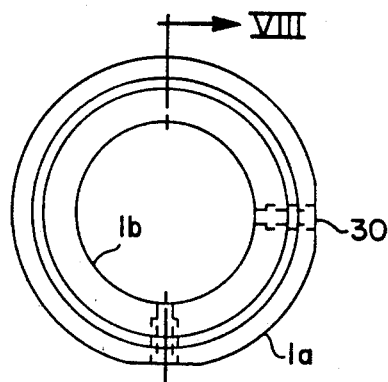
FIG. 7 is an end view of the base of the mount of this invention.

FIG. 8 is a sectional view along the line VIII—VIII of FIG. 7 showing the tapped mounting holes used with conventional optical mounting posts.

FIG. 9 is side view of a portion of the first axial rotation cylinder 5 showing the upper bearing spring plate 64, having a hole 61c with the upper ball 61b positioned therein. Spring plate 64 is shown in detail in FIG. 9a and is secured to rotation cylinder 5 by means of screws 66 and 67. The knurled rim 6 is not shown in this view.

The end view of rotation cylinder 5 in FIG. 10 illustrates the tapped holes which receive screws 7 to rotation cylinder 5.

The sectional view of FIG. 11, taken along the line XI—XI of FIG. 10 shows the aperture 80 and the slot 81 which accommodate the cam follower 55 of element holder 60 and the bearing spring plate 64. Lower ball 62b is also shown.

Optical element holder 60 is shown in top and end views of FIGS. 12 and 13 and the sectional view of FIG. 14. With reference to FIG. 12, element holder 60 has a conical seat 61a adapted to receive the bearing ball, not shown. A cam follower 55 is positioned on the periphery of optical element holder 60 at a point midway between the conical seats 61a and 62a. The end of cam follower 55 has a conical seat 56 to receive a bearing ball 57 which rides on cam surface 52.

The sectional view of FIG. 14, taken along the line XIV—XIV of FIG. 13 shows the interior groove 63 which is used to retain the birefringent crystal 65 preferably of Magnesium Fluoride approximately 2 mm in thickness and having parallel, optically flat surfaces.

Magnesium Fluoride is a preferred choice for the optical element 65. Alternatively, a Brewster plate may be used as the optical element.

Figures 15, 16:
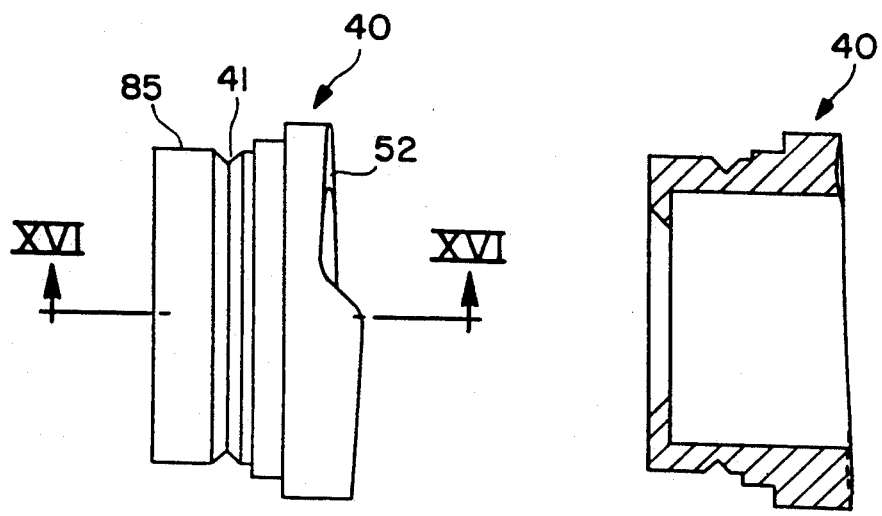
FIG. 15 is a side view of one component of the second axially rotatable cylinder illustrating the axial cam surface.
FIG. 16 is a sectional view of the cylinder component shown on FIG. 15.

The cam portion of the second, tilt, rotatable cylinder is shown in FIGS. 15 and 16. The outer diameter of cylindrical surface 85 matches the interior diameter 90 of outer portion 20. "V" groove 41 is positioned to accommodate the conical point of set screws passing through outer portion 22 and hold the portions 22 in engagement with cam portion 40. Axial cam surface 52 is adapted to displace the cam follower 55 in the axial direction when it is rotated. The sectional view of FIG. 16 is taken along the line XVI—XVI of FIG. 15. The cam surface is a one turn Buttress thread of 8 pitch with a face normal to its axis.

Figures 17, 19:
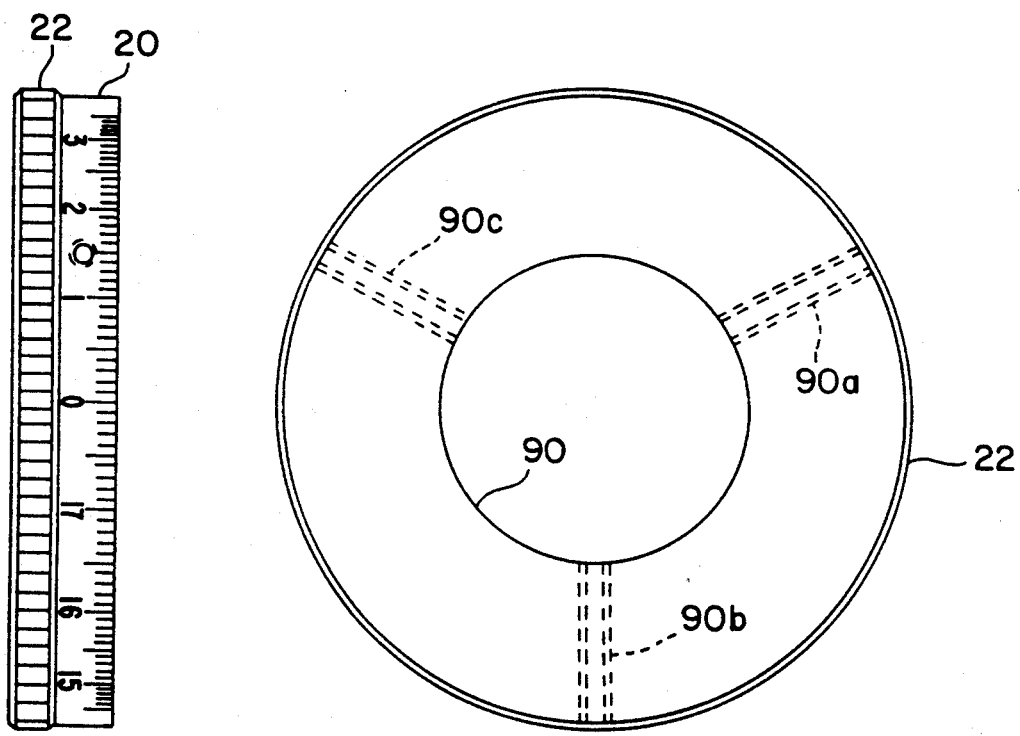
FIG. 17 is an end view of the tilt adjustment ring component of the second axially rotatable cylinder.
Figure 18:
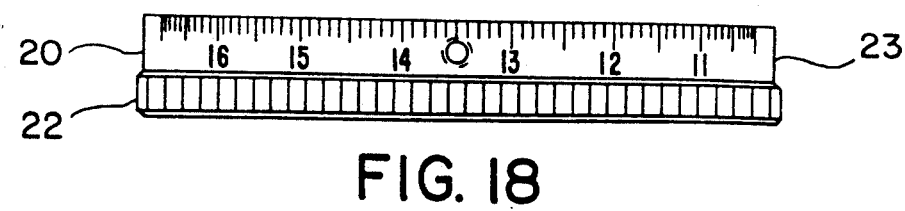
FIG. 18 is a side view of the tilt adjustment ring component of the second axially rotatable cylinder; and, FIG. 19 is another side view of the tilt adjustment ring component of the second axially rotatable cylinder showing the calibration indicia.

FIGS. 17, 18 and 19 show the outer portion 23 of tilt cylinder 20. The interior cylindrical surface 90 fits over the outer cylindrical surface 85 of the cam portion 40. Tapped holes 90a, 90b and 90c accommodate set screws with conical points which engage the "V" groove 41 in cam portion 40. FIG. 18 shows the knurled surface 22 which facilitates adjustment. FIG. 19 shows the indicia which provide an indication of the tilt angle.

MODE OF OPERATION

In operation, the optical mount of this invention will be set to the zero tilt position and inserted within a conventional optical mount. Once positioned, the radiation source is energized and the mount is moved to a more accurate position by observing the reflected beam at the source. The rotation cylinder 5 is then rotated by grasping knurled rim 6 to provide the correct axial orientation of the crystal 65. The desired phase shift may then be obtained by rotation of the tilt cylinder by grasping the knurled portion of rim 22.

Various modifications can be made to the present invention without departing from the apparent scope hereof.

We claim:

1. A mount for a Berek compensator comprising:
 a. a stationary base ring having a first, outer, cylindrical surface, a second, inner, cylindrical surface, a first end surface and a second end surface;
 b. a first axially rotatable cylinder positioned within said base ring in abutting relationship with said second, inner, cylindrical surface and said first and second end surfaces to accommodate rotational movement of said cylinder relative to said ring;
 c. a second axially rotatable tilt cylinder axially rotatably mounted to said first rotatable cylinder and having an axial cam surface (at one end thereof);
 d. an optical element holder positioned within said first axially rotatable cylinder for receiving and retaining an optical element;
 e. first and second tilt bearing receptacles at diametrically opposite positions on said holder;
 f. a cam follower portion of said optical element holder for engagement with said axial cam surface; and,
 g. first and second bearing elements on said first axially rotatable cylinder positioned within said inner cylindrical surface for engagement with said first and second tilt bearing receptacles of said optical element holder, whereby rotation of said first axially rotatable cylinder rotates said optical element holder and said second axially rotatable tilt cylinder and whereby rotation of said second axially rotatable tilt cylinder relative to said first axially rotatable cylinder causes said optical element holder to tile relative to said first axially rotatable cylinder.

2. A device according to claim 1 wherein said optical element is a birefringent crystal having first and second parallel faces with optical axis perpendicular to said faces.

3. An optical device comprising:
 a. a stationary base ring having a first, outer, cylindrical surface, a second, inner, cylindrical surface, a first end surface and a second end surface;
 b. a first axially rotatable cylinder positioned within said base ring in abutting relationship with a second, inner, cylindrical surface and said first and second end surfaces to accommodate rotational movement of said cylinder relative to said ring;
 c. a second axially rotatable tilt cylinder axially rotatably mounted to said first rotatable cylinder and having an axial cam surface;
 d. an optical element holder positioned within said first axially rotatable cylinder for receiving and retaining an optical element;
 e. a cam follower portion of said optical element holder for engagement with said cam surface;
 f. first and second tilt bearing receptacles at diametrically opposite positions on said holder; and,
 g. first and second bearing elements on said first axially rotatable cylinder positioned within said inner cylindrical surface for engagement with said first and second tilt bearing receptacles of said optical element holder whereby rotation of said first axially rotatable cylinder rotates said optical element holder and said second axially rotatable tilt cylinder and whereby rotation of said second axially rotatable tilt cylinder relative to said first axially rotatable cylinder causes said optical element holder to tilt relative to said first axially rotatable cylinder.

4. A device according to claim 3 wherein said optical element is a birefringent crystal having first and second parallel faces with optical axis perpendicular to said faces to provide a Berek compensator.

5. A device according to claim 3 wherein said optical element is a Brewster plate.

6. A device according to claim 3 wherein said first axially rotatable cylinder includes a first outer cylindrical surface having a diameter corresponding to the diameter of said inner cylindrical surface of said base ring to permit insertion of said first outer cylindrical surface of said first axially rotatable cylinder into said base ring whereby a rotation bearing is provided.

7. A device according to claim 6 wherein:
 a. said first axially rotatable cylinder has a tilt vernier outer cylindrical surface extending outward from said first outer cylindrical surface of said first axially rotatable cylinder and having a diameter smaller than said first outer cylindrical surface to permit passage of said tilt vernier cylindrical surface through the inner cylindrical surface of said base ring; and, b. a tilt vernier barrel having first and second end surfaces, mounted on said tilt vernier cylinder outer cylindrical surface with said first end surface abutting said second end surface of said base ring to retain said first axially rotatable cylinder within said base ring.

8. A device according to claim 7 further including:
a. a "V" groove in said outer surface of said tilt vernier cylinder positioned under said tilt vernier barrel; and,
b. a plurality of cone point set screws passing through said tilt vernier barrel to bear against said "V" groove and retain said tilt vernier barrel on said tilt vernier cylinder.

9. A device according to claim 7 wherein said optical element is a birefringent crystal having first and second parallel faces with optical axis perpendicular to said faces to provide a Berek compensator.

10. A device according to claim 7 wherein said optical element is a Brewster plate.

11. A device according to claim 3 wherein said first tilt bearing receptacle comprises a bearing support spring affixed to said first axially rotatable cylinder and adapted to apply pressure to said first bearing element.

12. A device according to claim 11 wherein bearing support spring includes a hole for receiving said first bearing element.

13. A device according to claim 3 wherein said first axially rotatable cylinder includes a knurled rim at the end thereof having a diameter greater than other portions of said first axially rotatable cylinder for adjustment of said first axially rotatable cylinder relative to said base ring.

14. A device according to claim 3 wherein said tilt cylinder includes a knurled outer portion at the end thereof having a diameter greater than other portions of said tilt cylinder for adjustment of said tilt cylinder relative to said first axially rotatable cylinder.

15. An optical device comprising:
a. a stationary base ring having a first, outer, cylindrical surface, a second, inner, cylindrical surface, a first end surface and a second end surface;
b. a first axially rotatable cylinder positioned within said base ring in abutting relationship with a second, inner, cylindrical surface and said first and second end surfaces to accommodate rotational movement of said cylinder relative to said ring;
c. a second axially rotatable tilt cylinder rotatably mounted to the inner surface of said first axially rotatable cylinder and having an axial cam surface positioned with said first rotatable cylinder;
d. said axial cam surface comprising an end surface of said tilt cylinder in a one turn thread configuration;
e. an optical element holder positioned within said first axially rotatable cylinder for receiving and retaining an optical element;
f. a cam follower portion of said optical element holder for engagement with said cam surface;
g. first and second tilt bearing receptacles at diametrically opposite positions on said holder; and,
h. first and second bearing elements on said first axially rotatable cylinder positioned within said inner cylindrical surface for engagement with said first and second tilt bearing receptacles of said optical element holder whereby rotation of said first axially rotatable cylinder rotates said optical element holder and said second axially rotatable tilt cylinder and whereby rotation of said second axially rotatable tilt cylinder relative to said first axially rotatable cylinder causes said optical element holder to tilt relative to said first axially rotatable cylinder.

16. A device according to claim 15 wherein said one turn thread has a pitch of 8 TPI and a face normal to its axis.

17. A device according to claim 15 wherein said optical element is a Brewster plate.

18. An optical device comprising:
a. a stationary base ring having a first, outer, cylindrical surface, a second, inner, cylindrical surface, a first end surface and a second end surface;
b. a vernier rotation index on said outer cylindrical surface;
c. a first axially rotatable cylinder positioned within said base ring in abutting relationship with a second, inner, cylindrical surface and said first and second end surfaces to accommodate rotational movement of said cylinder relative to said ring;
d. a rotation scale on an outer cylindrical surface of said rotation cylinder abutting the portion of said outer cylindrical surface containing said vernier rotation index to provide an indication of the position of said rotation cylinder relative to said base ring;
e. a second axially rotatable tilt cylinder axially rotatably mounted to said first rotatable cylinder and having an axial cam surface;
f. an optical element holder positioned within said first axially rotatable cylinder for receiving and retaining an optical element;
g. a cam follower portion of said optical element holder for engagement with said cam surface;
h. first and second tile bearing receptacles at diametrically opposite positions on said holder; and,
i. first and second bearing elements on said first axially rotatable cylinder positioned within said inner cylindrical surface for engagement with said first and second tilt bearing receptacles of said optical element holder whereby rotation of said first axially rotatable cylinder rotates said optical element holder and said second axially rotatable tilt cylinder and whereby rotation of said second axially rotatable tilt cylinder relative to said first axially rotatable cylinder causes said optical element holder to tilt relative to said first axially rotatable cylinder.

19. A device according to claim 18 wherein said optical element is a birefringent crystal having first and second parallel faces with optical axis perpendicular to said faces to provide a Berek compensator.

20. A device according to claim 18 wherein said first axially rotatable cylinder further includes:
a. a tilt vernier index on an outer cylindrical surface on the opposite side of said base ring from said surface containing said rotation scale and rotatably movable therewith; and,
b. a tilt scale on an outer cylindrical surface of said tilt cylinder abutting the portion of said first axially rotatable cylinder containing said tilt vernier index whereby said tilt vernier index rotates with said rotation scale when said first axially rotatable cylinder is rotated relative to said base ring.

21. A device according to claim 20 wherein said optical element is a birefringent crystal having first and second parallel faces with optical axis perpendicular to said faces.

22. A device according to claim 20 wherein said optical element is a Brewster plate.

* * * * *